(12) United States Patent
Bolle et al.

(10) Patent No.: US 9,031,818 B2
(45) Date of Patent: May 12, 2015

(54) ADAPTIVE MULTIPLE SHOOTING OPTIMIZATION METHOD FOR DETERMINING OPTIMAL SPACECRAFT TRAJECTORIES

(75) Inventors: Andrea Bolle, Rome (IT); Christian Circi, Rome (IT); Giuseppe Corrao, Rome (IT)

(73) Assignee: TELESPAZIO S.p.A., Rome (IT)

( * ) Notice: Subject to any disclaimer, the term of this patent is extended or adjusted under 35 U.S.C. 154(b) by 498 days.

(21) Appl. No.: 13/518,790

(22) PCT Filed: Dec. 24, 2009

(86) PCT No.: PCT/IT2009/000580
§ 371 (c)(1),
(2), (4) Date: Nov. 2, 2012

(87) PCT Pub. No.: WO2011/077468
PCT Pub. Date: Jun. 30, 2011

(65) Prior Publication Data
US 2013/0046520 A1    Feb. 21, 2013

(51) Int. Cl.
*G06F 17/10* (2006.01)
*G06G 7/48* (2006.01)
*B64G 1/24* (2006.01)
*B64G 1/00* (2006.01)

(52) U.S. Cl.
CPC ..................... *B64G 1/007* (2013.01)

(58) Field of Classification Search
USPC .............. 703/2, 6, 8; 701/3, 4, 13; 244/158.1, 244/164, 171.4; 342/62
See application file for complete search history.

(56) References Cited

U.S. PATENT DOCUMENTS 5,400,033 A * 3/1995 Hablani .......................... 342/95
6,845,950 B1 * 1/2005 Goodzeit et al. ........... 244/158.6
7,464,898 B1 * 12/2008 Goodzeit et al. .............. 244/164

OTHER PUBLICATIONS

Gath, "CAMTOS—A Software Suite Combining Direct and Indirect Trajectory Optimization Methods," Dec. 31, 2002, http://elib-uni-stuttgart.de/opus/volltexte/2003/1273/pdf/Dissertation_Gath_Peter.pdf, accessed Dec. 22, 2010.
Park et al., "Mission design for Human Outer Planet Explorationusing a magnetoplasma spacecraft," Planetary and Space Science 54:737-749, 2006.

* cited by examiner

*Primary Examiner* — Aniss Chad
*Assistant Examiner* — Andre Pierre Louis
(74) *Attorney, Agent, or Firm* — Seed IP Law Group PLLC

(57) ABSTRACT

Disclosed herein is a method for determining a trajectory for a transfer of a spacecraft from a starting space body to a target space body with respect to a given central space body, wherein the determined trajectory is optimal with respect to a given space mission requirement to be met by the transfer of the spacecraft. The method comprises providing, according to the Pontryagin maximum principle, a physical-mathematical model relating model quantities and physical quantities representing the transfer of the spacecraft with respect to the given central space body.

20 Claims, 4 Drawing Sheets

ADAPTIVE MULTIPLE SHOOTING OPTIMIZATION METHOD FOR DETERMINING OPTIMAL SPACECRAFT TRAJECTORIES

TECHNICAL FIELD OF THE INVENTION

The present invention relates to determination of optimal spacecraft transfer trajectories and can be exploited to solve a wide range of problems involving optimization of trajectories of transfer of spacecrafts, such as spaceships, rockets, space shuttles, etc.

More in detail, the present invention permits to determine an optimal transfer trajectory in a given range of epoch, which optimal transfer trajectory allows, in general, to meet a given space mission requirement, and, in particular, to minimize transfer time, propellant consumption or a combination of both of them.

BACKGROUND ART

As is known, determination of the best spacecraft trajectory for a given mission is defined in literature as the "Two Point Boundary Problem", and it consists on a determination of a trajectory, among all possible ones, connecting two different points in space (representing the boundary conditions) and allowing to maximize or minimize a given cost function (also named cost index). Equations of motion are differential constraints of the problem.

Several optimization methods are known to be useful to solve optimization problems related to space transfers, which fall essentially into two main categories:

classical, indirect methods based on Pontryagin maximum principle; and direct methods, which attempt to find the minimum of the cost function through many numerical procedures and can be further grouped into direct methods applied to the calculus of variation, and
search techniques.

Also genetic algorithms are employed to solve problems related to interplanetary transfers.

A brief description of the previously listed known methods is given below.

The Pontryagin maximum principle is a basic theorem in the calculus of variation applied to optimal control theory: it gives some necessary conditions to determine an optimal solution to the problem under analysis, and it is based solely on differential properties that certain classes of functions exhibit at points of extrema. According to such conditions, it is possible to determine an evolution in time of some parameters, the so-called Lagrange multipliers, used to evaluate the control variables needed to solve the optimal problem. The initial values of the Lagrange multipliers are unknown, and they must be evaluated numerically so that boundary conditions are satisfied. In other words, the optimization problem is completely transferred to the determination of the starting values of the Lagrange multipliers. The problem becomes even more complex when the final state is not fully determined, that is, some variables of the state vector are not assigned at the boundary conditions. Beside the conditions given by the Pontryagin maximum principle, additional constraints defined as "transversality conditions" must be considered.

In detail, the indirect methods, through the conditions stated by the Pontryagin maximum principle, allow to determine at runtime which is the best way to employ the control variables to solve the optimization problem, but such variables are unknown at the beginning, as shown below.

Let $$\dot{x} = f(x, u, t)$$

be a system of partial differential equation of the first order, in which x is the state vector and u the so-called control vector, that is the vector to be determined at runtime to minimize or maximize a given cost function J. By recalling the formulation of the Bolza problem, the cost function may have the form:

$$J = \int_{t_0}^{t_f} L(x, u, t) dt + g[t_0, x(t_0), u(t_0), t_f, x(t_f), u(t_f)]$$

Let us assume, for example, the cost function J must be minimized. This leads to the following condition:

$$J^* = \inf_{\{u \in U\}} J$$

Let also $H(x, u, \lambda, t)$ be the Hamiltonian function associated to the system, written in the form:

$$H(x, u, \lambda, t) = \lambda^T \dot{x} - L.$$

Note that if another given functional l, defined as $$l = \int_{t_0}^{t_f} M(x, u, t) dt + h[t_0, x(t_0), u(t_0), t_f, x(t_f), u(t_f)]$$

has to be maximized, the previous formulas would become:

$$l^* = \sup_{\{u \in U\}} l$$

and $$H(x, u, \lambda, t) = \lambda^T \dot{x} + M,$$

where $\lambda$ is the vector of Lagrange multipliers (which is also defined as the co-state vector or the adjoint variable vector). The Pontryagin maximum principle states that if $x(t)$, $\lambda(t)$ satisfy the conditions:

$$\dot{x} = \frac{\partial H}{\partial \lambda}$$

$$\dot{\lambda} = -\frac{\partial H}{\partial x}$$

and for all $t \in \lfloor t_0; t_f \rfloor$ $$H(x, u, \lambda, t) \leq H(x, u^*, \lambda, t),$$

then $u^*$ is the desired optimal control which maximize the Hamiltonian function H.

Beside the Pontryagin maximum principle, if the state vector is not fully determined at the boundaries, farther conditions named "transversality conditions" must be added. The number of these additional constraints equals the amount of entries in the state vector which are undetermined at the boundaries. For example, if the final time is not established, the corresponding transversality condition shall be:

$$H_f = 1$$

if the minimum transfer time problem is considered, or:

$$H_f = 0$$

if the minimum propellant consumption problem is under analysis.

The number and the expression of the transversality conditions changes according to the given problem under analysis.

Let us apply the general formulation above to the two points problem, in the case of interplanetary transfers, for example let us consider an Earth-Mars transfer. Under the hypothesis of a co-planar transfer (all the orbits of the major bodies in the Solar System have a small inclination with respect to the Ecliptical plane), and considering an inertial reference frame xOy with the origin O coincident with the center of mass of the Sun, the motion equations can be written as follows:

$$\begin{cases} \dfrac{dx}{dt} = u \\ \dfrac{dy}{dt} = v \\ \dfrac{du}{dt} = -\dfrac{\mu}{(x^2+y^2)^{\frac{3}{2}}} x + \delta \dfrac{T}{m} v_x \\ \dfrac{dv}{dt} = -\dfrac{\mu}{(x^2+y^2)^{\frac{3}{2}}} y + \delta \dfrac{T}{m} v_y \\ \dfrac{dm}{dt} = -\delta|k| \end{cases}$$

where $\{x,y,u,v,m\}$ is the state vector (x,y are the position vector components whereas u,v are those of the velocity vector; m is the actual mass of the spacecraft), $\mu$ is the Sun gravitation parameter, T a thrust level achievable with a given propulsion system (continuous manoeuvre) and $\delta$ is an on-off function representing the propulsion system state ($\delta=0$, engine is off; $\delta=1$ engine is active). $\{v_x,v_y\}$ is the unit vector indicating the thrust direction. Given a departure time to and an arrival time $t_f$ of the spacecraft, let also be the functional $$J = t_f - t_0 = \int_{t_0}^{t_f} 1\, dt$$

that has to be minimized (i.e., transfer time has to be minimized); the corresponding Hamiltonian function shall assume the form:

$$H = \lambda_x u + \lambda_y v + \lambda_u \left[ -\dfrac{\mu}{(x^2+y^2)^{\frac{3}{2}}} x + \delta \dfrac{T}{m} v_x \right] +$$

$$\lambda_v \left[ -\dfrac{\mu}{(x^2+y^2)^{\frac{3}{2}}} y + \delta \dfrac{T}{m} v_y \right] - \lambda_m \delta |k| - 1$$

or in a more useful way:

$$H = \lambda_x u + \lambda_y v + \lambda_u \left[ -\dfrac{\mu}{(x^2+y^2)^{\frac{3}{2}}} x \right] +$$

$$\lambda_v \left[ -\dfrac{\mu}{(x^2+y^2)^{\frac{3}{2}}} y \right] + \delta \left[ \dfrac{T}{m} (\lambda_u v_x + \lambda_v v_y) - |k| \right] - 1$$

in which $\{\lambda_x, \lambda_y, \lambda_u, \lambda_v, \lambda_m\}$ is the Lagrange multiplier vector (co-state vector). Let's apply the Pontryagin maximum principle. The control is optimal if and only if:

$$\begin{cases} v_x = \dfrac{\lambda_u}{\sqrt{\lambda_u^2 + \lambda_v^2}} \\ v_y = \dfrac{\lambda_v}{\sqrt{\lambda_u^2 + \lambda_v^2}} \end{cases}$$

and $$\delta = 1 \text{ if } \left[ \dfrac{T}{m}(\lambda_u v_x + \lambda_v v_y) - |k| \right] > 0$$

The first condition states that the thrust direction vector $\{v_x,v_y\}$ must be aligned with the $\{\lambda_u,\lambda_v\}$ vector, whereas the second condition gives an indication whether it is convenient to set the thruster on or not. As for the co-state derivatives, the Pontryagin maximum principle states that:

$$\begin{cases} \dfrac{d\lambda_x}{dt} = \dfrac{\mu}{(x^2+y^2)^{\frac{5}{2}}} [\lambda_u(2x^2-y^2) + \lambda_v(3xy)] \\ \dfrac{d\lambda_y}{dt} = \dfrac{\mu}{(x^2+y^2)^{\frac{5}{2}}} [\lambda_v(2y^2-x^2) + \lambda_u(3xy)] \\ \dfrac{d\lambda_u}{dt} = -\lambda_x \\ \dfrac{d\lambda_v}{dt} = -\lambda_y \\ \dfrac{d\lambda_m}{dt} = \dfrac{T}{m^2}(\lambda_u v_x + \lambda_v v_y) \end{cases}$$

If all these conditions are respected, the Pontryagin maximum principle is fully satisfied, and the optimal thrust direction is given analytically through the co-state variables $\lambda_u,\lambda_v$. The main problem affecting this approach is that the initial values of $\{\lambda_x, \lambda_y, \lambda_u, \lambda_v, \lambda_m\}$ is unknown and it cannot be estimated through physical consideration; it is only possible to suppose the order of magnitude of each term by looking at the corresponding derivative. By far, there is a limited number of optimal vectors $\{\lambda_{x,0}, \lambda_{y,0}, \lambda_{u,0}, \lambda_{v,0}, \lambda_{m,0}\}$ that must be searched in $\Re^5$ (or in $\Re^7$ if the hypothesis of coplanar transfers lapses) allowing to reach the desired final conditions. It is clear that such an approach, although it gives an analytical expression for the optimal thrust direction and magnitude, appears quite unsatisfying because of the difficulty to reach the final conditions.

Instead, the direct methods applied to the calculus of variation are based on the approximation of the state vector and of the cost-functional through series representations. Once a proper set of elementary functions has been chosen for the series representation, under given hypotheses the unknown coefficients of the series can be found by imposing the extremization of the approximate cost functional. In other terms, the problem of extremizing a functional with respect to a set of functions is reduced to the extremization of a function with respect to a set of parameters. The solution obtained is in general an approximate solution, unless the set of parameters is an infinite set.

In detail, this kind of direct methods aims to reduce the problem of maximizing (or minimizing) a functional with respect to a function to the problem of maximizing (or minimizing) a function with respect to a set of variables, through series representations, albeit, the solution obtained is in general an approximate solution, unless the set of parameters is an infinite set. Let's consider a 1-dimensional differential problem written in the form $\dot{x}=f(x,u,t)$, in which x is the state vector and u the control vector. Let also $J(x)$ be the functional to be maximized or minimized. Series approximation methods are based on the assumption that a function $x=x(t)$ which makes maximum (or minimum) a functional $J(x)$ can be expanded in a series of the form:

$$x(t) = \sum_{k=0}^{\infty} a_k \psi_k(t)$$

and also $$\dot{x}(t) = \sum_{k=0}^{\infty} a_k \dot{\psi}_k(t)$$

where $a_k$'s are coefficients independent of time and $\Psi_k(t)$ are known functions. It is clear that truncated forms of the previous expressions must be employed:

$$x_n(t) = \sum_{k=0}^{n} a_k \psi_k(t)$$

$$\dot{x}_n(t) = \sum_{k=0}^{n} a_k \dot{\psi}_k(t).$$

It is assumed that this sequence of approximating functions is complete for functions $x(t)$. By definition, a sequence of approximating functions is complete under the following condition: for all $\epsilon > 0$, there exists an integer j such that:

$$\min_{a_k's} \left[ \max_{t \in [t_0; t_f]} |x_j(t) - x(t)| \right] < \varepsilon$$

The importance of this definition lies in the fact that $$\min_{x} J(x) = \min_{a_k's} \left[ \lim_{j \to \infty} J(x_j) \right]$$

if $J(x)$ is strongly continuous and if the sequence of functions is complete. The approximate functional $J_n(x_n)$ shall assume the form:

$$J_n(x_n) = \int_{t_0}^{t_f} L(x_n, \dot{x}_n, t) dt$$

To solve the optimization problem, $J_n(x_n)$ must be stationary with respect to each $a_k$'s, that is:

$$\frac{\partial J_n(x_n)}{\partial a_k} = \int_{t_0}^{t_f} \frac{\partial L(x_n, \dot{x}_n, t)}{\partial a_k} dt$$

Once, the indicated integrations are effected, the resulting set of equations can be solved for stationary points, and those stationary points which are relative maxima (or minima) can be determined through search techniques. The functional $J_n(x_n)$ is often expressed as follows:

$$f = \sum_{j=0}^{m} \sum_{i=0}^{m} b_{ij} x_{in} \dot{x}_{jn}$$

Moreover, the search techniques are based on numerical procedures to evaluate the optimal solution starting from the approximate evaluation of the cost function. Once such an approximation is obtained, the set of variables maximizing (or minimizing), the cost function are then searched in a given domain; therefore such methods are also defined "search techniques". The function can be given analytically or it can be determined experimentally; it may or may not exhibit discontinuities, and there can be constraint equations limiting the arguments of the performance measure. In the latter case, the problem is called "the non linear programming" problem. Among the maximum (or minimum) search techniques, gradient-based methods, univariate search and non-sequential search are worth to be mentioned.

Furthermore, the genetic algorithms are search techniques used to find exact or approximate solutions to optimization and search problems. They belong to the wide class of evolutionary algorithms, that use theoretical constructs inspired by evolutionary biology such as inheritance, mutation, selection, and crossover. Several sets consisting of two or more control parameters, called chromosomes, are chosen to solve the optimization problem; once the chromosomes have been built, a random "matches" between chromosomes take place, and through the crossover, new chromosomes (offspring) hopefully closer to the desired solution are breed. Crossovers occurs according to given rules. The whole process is then repeated until no significant improvements are obtained; in this way the algorithm finds the optimal solution.

All the previously described optimization techniques are affected by intrinsic limitations, bounding their pertinence to a given problem or their efficiency in finding a solution.

Furthermore, the Applicant has noted that the "Two Point Boundary Problem" applied to spacecraft transfers, not only interplanetary ones, has proved to be more complex than it was thought to be (this result will be described below), and this strongly affect the validity of each previously described method.

As for the indirect methods, although some analytic constraints for optimality are satisfied, there is no way to establish a priori the value of the initial Lagrange multipliers allowing to meet the boundary conditions. A three dimensional analysis of the optimal two point problem would require six multipliers for the spacecraft state vector, plus one corresponding to its mass. Furthermore, if the initial epoch is a parameter for optimization, also the starting instant $t_0$ to begin the mission must be considered. About the initial epoch $t_0$, it may be important to underline that, when considering interplanetary transfers, especially when transfers among inner planets are under analysis, the choice of the initial epoch to plays a fundamental role in the mission planning, since the epoch rules the mutual position between the starting point and the target. If the mutual position is not chosen properly, the space mission might also fail.

Therefore, as for the indirect methods, up to eight variables for optimization can be included in the analysis for optimization, and this leads to a large expense of computational time.

As for the direct methods applied to the calculus of variations, it is quite difficult to obtain an analytic expression for the error induced by the previously described procedure, therefore it is difficult to estimate whether the approximation of the cost function converges or not, so it is difficult to understand if the approximate solution matches the real behavior of the optimal solution. Furthermore, the analysis of N-dimensional problems, such as an interplanetary transfer, requires a wide number of integrations and coefficients, but all these efforts might not be sufficient by themselves to ensure a satisfying representation of the cost functional because of the cross-dependence of each variable in the state vector.

Another limitation affecting this kind of methods is that the cost functional, as well as the state vector components, must be continuous in the domain of integration. Problems involving instantaneous changes in the state vector, for example the switch of reference frame during an interplanetary transfer or the loss of a stage when analyzing a launcher trajectory, cannot be approached reliably through these methods.

The gradient methods are based on the determination of the cost function gradient through several evaluations of the function itself with respect to given parameters; the better is the knowledge of the function gradient, the greater is the probability of finding a minimum (or maximum) in the search domain. Local minimums can be obtained quickly if the cost function is smooth with respect to the chosen parameters; yet problems such as spacecraft trajectory evaluation are characterized by cost functional which is striking irregular, as shown in the followings. Therefore gradient-based search techniques might not be reliable when considering this kind of problems.

The univariate search methods are quite simply and easy to be implemented. Such methods have been used, for example, by everyone who has had occasion to tune an electrical circuit by adjusting several parameters. First, one parameters is adjusted until no farther improvement is gained; then another parameter is tuned until no additional improvement results, and so on. After each parameter has been adjusted once, the process is repeated by returning to the first parameter and proceedings as described before. Under the non-plausible hypothesis that the parameters do not interacts one with each other, this procedure leads to the desired optimal configuration. Cross-dependence among variables strongly affects fields of application of this procedure.

The non-sequential search is conducted over evenly spaced points in a simply connected region of a Euclidean space. Each of the $x_i$ coordinates is assigned a set of evenly spaced points, called grid points, and only the values of $x_i$ at these grid points are used. The cost function is then evaluated for all the possible combinations of the grid points, and the grid value of the vector x leading to the best $f(x)$ is deemed the winner. The grid spacing must be chosen accordingly by the searcher; as for the number of data points required, if each $x_i$ coordinate is assigned k spaced points, the total number of data is $k^n$, being n the number of entries in x. The non-sequential search techniques do not require assumptions concerning the abruptness of changes in the state vector and in the cost functional, but the large number of evaluations required makes them quite inefficient.

Let's, now, consider the Two Point Boundary Problem, and assume that the overall transfer time is the functional to be minimized. A general technique used to solve the two points problem is to minimize an $$\tilde{J}(t_f, r_{target}, V_{target}, \gamma_f) = \sqrt{\left[\frac{(r_f - r_{target})}{\delta r}\right]^2 + \left[\frac{(V_f - V_{target})}{\delta V}\right]^2 + \left[\frac{(\gamma_f)}{\delta \gamma}\right]^2} + \left[\frac{t_f}{t_{ref}}\right]$$

augmented cost function $\tilde{J}$, which is a weighted combination of the cost functional itself plus the norm of the error evaluated at the boundaries:

where $(r_f-r_{target})$ is a difference between the spacecraft final position vector and the target position vector, $(V_f-V_{target})$ is a difference between the spacecraft final velocity vector and the target velocity vector, and $\gamma_f$ is the flight angle, which must be close to zero so that the spacecraft transfer trajectory is eventually tangent to the target orbit at the encounter. Coefficients $\delta r, \delta V, \delta \gamma$ represent tolerances, as well as $t_{ref}$ that have been introduced to make the functional homogeneous. Such a cost functional is useful to increase the likelihood of convergence towards the optimal solution with the given boundary constraints. The problem arising is that this kind of function shows two distinct trends which make finding the optimal solution very difficult.

In particular, this kind of function shows a smooth, macroscopic trend and an irregular, microscopic behaviour, as shown in FIG. 1 and in FIG. 2, respectively.

In detail, FIG. 1 shows an example of the macroscopic trend of the augmented cost function $\tilde{J}$ which appears smooth in wide regions of space, while FIG. 2 shows an example of the microscopic trend of the augmented cost function $\tilde{J}$ wherein the region close to the origin is crowded with a striking number of peaks and valleys.

It represents a proof of the fact that the Two Point Boundary Problem is often much more difficult than it was thought, and the convergence to the true optimal solution is an extremely improbable event, at least through the known optimization algorithms described above.

OBJECT AND SUMMARY OF THE INVENTION

The Applicant has carried out an in-depth study in order to investigate the possibility to develop an efficient, computationally inexpensive method for reliably determining optimal trajectories of transfer for spacecrafts.

The objective of present invention is then to provide a method for determining optimal trajectories of transfer for spacecrafts, which allows to solve previously described problems of the known techniques and to circumvent obstacles which make the known algorithms inefficient.

This objective is achieved by the present invention in that it relates to a method for determining an optimal trajectory for a transfer of a spacecraft, a software program comprising software code portions for implementing, when run, said method, a software program product comprising a computer-readable medium having said software program stored therein, an electronic processor configured to implement said method, and a spacecraft comprising an electronic processor configured to implement said method, as defined in the appended claims.

In particular, the present invention relates to a method for determining a trajectory for a transfer of a spacecraft, for example a spaceship, a rocket, a space shuttle, etc., from a starting space body to a target space body with respect to a given central space body, the determined trajectory being optimal with respect to a given space mission requirement to be met by the transfer of the spacecraft; the method comprising:

providing, according to the Pontryagin maximum principle, a physical-mathematical model relating model quantities and physical quantities representing the transfer of the spacecraft with respect to the given central space body, the model quantities comprising a first model vector quantity and a second model vector quantity, the first model vector quantity having a first modulus changing in time and a first space orientation which changes in time and is defined by a first longitude angle changing in time and by a first elevation angle changing in time, the first model vector quantity representing, instant by instant, a respective optimal direction of thrust of the spacecraft with respect to the given space mission requirement, the second model vector quantity having a second modulus changing in time and a second space orientation which changes in time and is defined by a second longitude angle changing in time and by a second elevation angle changing in time, the second model vector quantity representing, instant by instant, a time-evolution of the first model vector quantity;

setting, in the physical-mathematical model, starting and final boundary conditions, the starting boundary conditions being such that, at a starting time of the transfer, position and velocity of the spacecraft are close to position and velocity, respectively, of the starting space body, the final boundary conditions being such that, at a final time of the transfer, position and velocity of the spacecraft are close to position and velocity, respectively, of the target space body;

setting, in the physical-mathematical model, first conditions such that the second modulus, is related to the first modulus through a angular-velocity-related quantity depending on the given central space body;

setting, in the physical-mathematical model, second conditions such that a specific longitude angle, between the first longitude angle and the second longitude angle, and a specific elevation angle, between the first elevation angle and the second elevation angle, are independent one from the others;

considering first starting times included in a given time range, first longitude values of the specific longitude angle included in a given longitude range, and first elevation values of the specific elevation angle included in a given elevation range; and determining a trajectory for the transfer of the spacecraft on the basis of physical-mathematical model, of the considered first starting times, of the considered first longitude values, and of the considered first elevation values.

Preferably, determining a trajectory for the transfer of the spacecraft on the basis of physical-mathematical model, of the considered first starting times, of the considered first longitude values, and of the considered first elevation values comprises:

computing values of a given cost function related to the given space mission requirement, the values of the given cost function being computed based on the considered first starting times, on the considered first longitude values and on the considered first elevation values;

determining an approximate cost function on the basis of the computed values of the given cost function;

computing values of the approximate cost function based on the considered first starting times, on the considered first longitude values and on the considered first elevation values;

identifying, among the computed values of the approximate cost function, an extreme value of the approximate cost function, and, among the considered first starting times, among the considered first longitude values, and among the considered first elevation values, an optimal starting time, an optimal longitude value, and an optimal elevation value, respectively, which the extreme value of the approximate cost function has been computed based on; and determining a trajectory for the transfer of the spacecraft on the basis of the physical-mathematical model, of the identified optimal starting time, of the identified optimal longitude value, and of the identified optimal elevation value.

More preferably, the method according to the present invention further comprises:

if the trajectory determined on the basis of the physical-mathematical model, of the considered first starting times, of the considered first longitude values, and of the considered first elevation values does not meet the starting boundary conditions and the final boundary conditions with a pre-defined tolerance, selecting a time sub-range on the basis of the given time range and of the identified optimal starting time, selecting a longitude, sub-range on the basis of the given longitude range and of the identified optimal longitude value, selecting an elevation sub-range on the basis of the given elevation range and of the identified optimal elevation value, considering second starting times included in the selected time sub-range, second longitude values of the specific longitude angle included in the selected longitude sub-range, and second elevation values of the specific elevation angle included in the selected elevation sub-range, and determining the trajectory for the transfer of the spacecraft on the basis of the physical-mathematical model, of the considered second starting times, of the considered second longitude values, and of the considered second elevation values.

In particular, selecting a time sub-range on the basis of the given time range and of the identified optimal starting time comprises:

selecting a time sub-range which is included in the given time range, has a smaller extent than an extent of the given time range, and is centred on the identified optimal starting time.

Moreover, selecting a longitude sub-range on the basis of the given longitude range and of the identified optimal longitude value comprises:

selecting a longitude sub-range which is included in the given longitude range, has a smaller extent than an extent of the given longitude range, and is centred on the identified optimal longitude value.

Furthermore, selecting an elevation sub-range on the basis of the given elevation range and of the identified second elevation value comprises:

selecting an elevation sub-range which is included in the given elevation range, has a smaller extent than an extent of the given elevation range, and is centred on the identified optimal elevation value.

Conveniently, the method according to the present invention further comprises:

if the trajectory determined on the basis of the physical-mathematical model, of the considered second starting times, of the considered second longitude values, and of the considered second elevation values does not meet the starting boundary conditions and the final boundary conditions with the pre-defined, tolerance, repeating selecting a new time sub-range on the basis of a previously selected time sub-range range and of a previously identified optimal starting time, selecting a new longitude sub-range on the basis of a previously selected longitude sub-range and of a previously identified optimal longitude value, selecting a new elevation sub-range on the basis of a previously selected elevation sub-range and of a previously identified optimal elevation value, considering new starting times included in the selected new time sub-range, new longitude values of the specific longitude angle included in the selected new longitude sub-range, and new elevation values of the specific elevation angle included in the selected new elevation sub-range, and determining the trajectory for the transfer of the spacecraft on the basis of the physical-mathematical model, of the considered new starting times, of the considered new longitude values, and of the considered new elevation values;

and stopping repeating if the trajectory determined on the basis of the physical-mathematical model, of the considered new starting times, of the considered new longitude values, and of the considered new elevation values meets the starting boundary conditions and the final boundary conditions with the pre-defined tolerance.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

Figure 1:
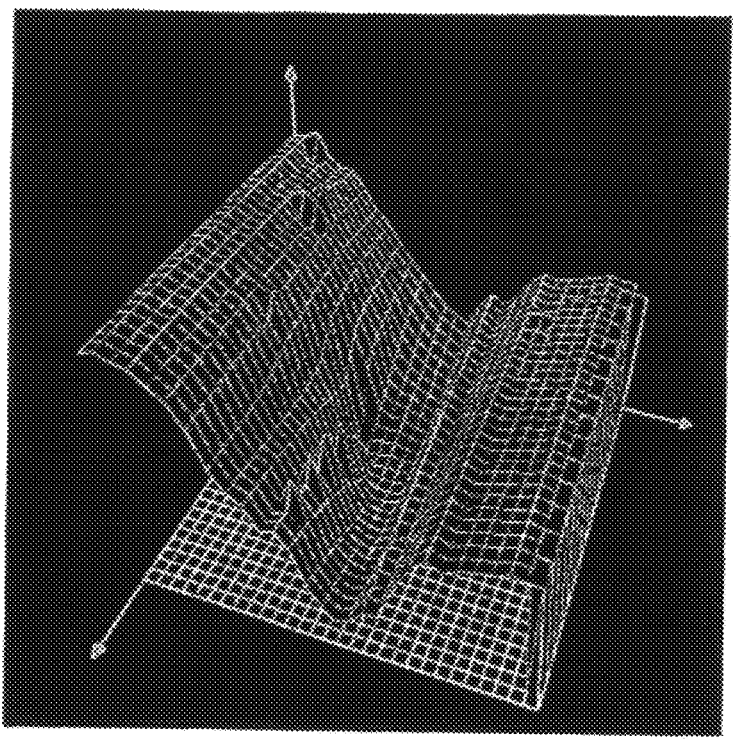
FIG. 1 shows macroscopic trend of an augmented cost function to be minimized to solve Two Point Boundary Problem.
Figure 2:
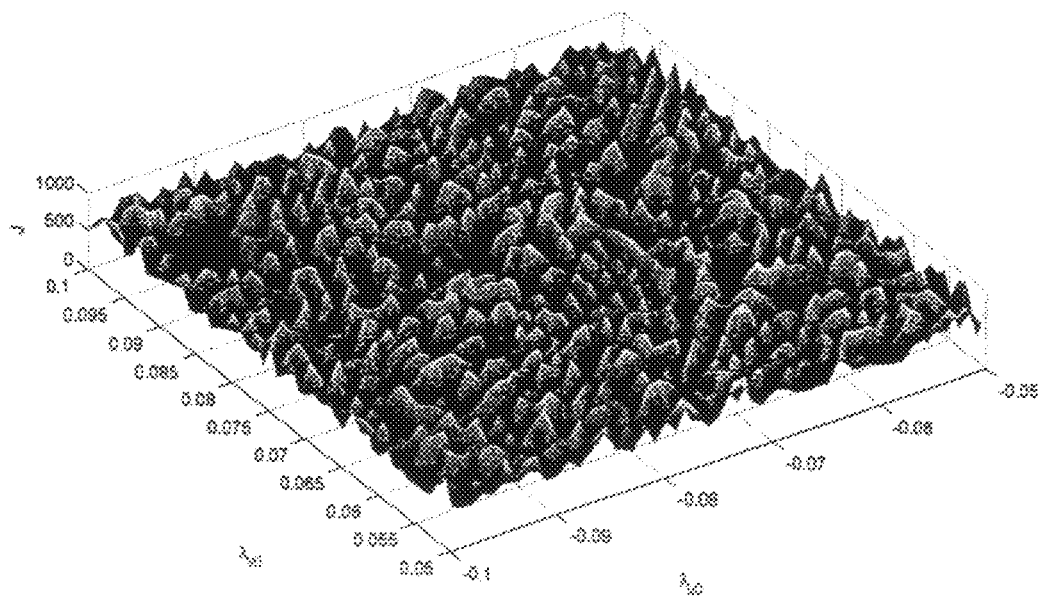
FIG. 2 shows microscopic trend of the augmented cost function in FIG. 1.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Moreover, the present invention is implemented by means of a software program, loadable in a memory of an electronic processor, and comprising software code portions for implementing, when the software program is run by the electronic processor, the method for determining optimal trajectories of transfer for spacecrafts described hereinafter.

The present invention relates to an adaptative, multiple shooting method, i.e., algorithm, for solving the so-called "Two Point Boundary Problem" applied to trajectories of transfer of spacecrafts. Such a method, taking into account all previous efforts to solve problems concerning space trajectory optimization, allows to calculate a thrust direction necessary to encounter boundary conditions by minimizing a given cost functional, according to a given propulsion system.

The Applicant has noted that the previously described augmented cost function $\tilde{J}$ has a shape which requires a search algorithm neither based on the gradient evaluation typical of direct methods, nor on a series expansion of the cost functional, as in the direct methods applied to the calculus of variations.

The algorithm according to the present invention inventively exploits different aspects of the direct and indirect methods previously described, plus an innovative capability of adapting the search of the maximum (or minimum) according to the shape of the cost function. The algorithm according to the present invention can be comprised in the wide family of non-sequential factorial search algorithms, since it comprises an evaluation of the cost functional based on trying all possible combinations of a given set of parameters ranging in proper intervals. The given set of parameters is represented by initial values of the Lagrange multipliers, chosen according to the Pontryagin maximum principle and to the transversality conditions. This choice ensures that necessary conditions for optimality are satisfied, in fact, otherwise, it would not be possible to ensure that a solution of the two point boundary problem is optimal. Such an approach is actually new.

Furthermore, initial search regions of a starting set of the Lagrange multipliers are determined through innovative analytic considerations developed by the inventors.

After each iteration, that is after having tried all possible combinations of the initial values of the Lagrange multipliers, only one of them is elected winner; the others are stored in matrices together with the corresponding cost function and the evolution in time of the state vector. Since the search domain can be restricted through analytic consideration, a single iteration leads to a suboptimal solution which is closer to the best attainable one. If further iterations are needed, the previously stored data are used to generate a series expansion of the state vector, whose coefficients depends solely upon the initial choice of the Lagrange multipliers. By imposing the given boundary conditions it is possible to obtain a new set of initial values fitting in a better way the boundary conditions and satisfying the conditions for optimality at the very same time. There is a fundamental difference between the approach of the present invention and the known direct methods applied to the calculus of variation. In known direct methods, coefficients of the state vector series expansion must satisfy conditions for optimality plus the boundary conditions; series expansion coefficients in the algorithm according to the present invention have to satisfy only the boundary conditions, since conditions for optimality stated by the Pontryagin maximum principle are already satisfied. Once a candidate solution has been found, the search domain is resized and the node distribution is thickened around such a candidate set. The adaptability of the algorithm itself to resize the search area boundaries accordingly, and the self-adjusting capability of nodal distribution around a candidate set of initial Lagrange multipliers is a further innovative aspects of the algorithm. After a few number of iteration, an optimal solution is obtained.

Figure 3:
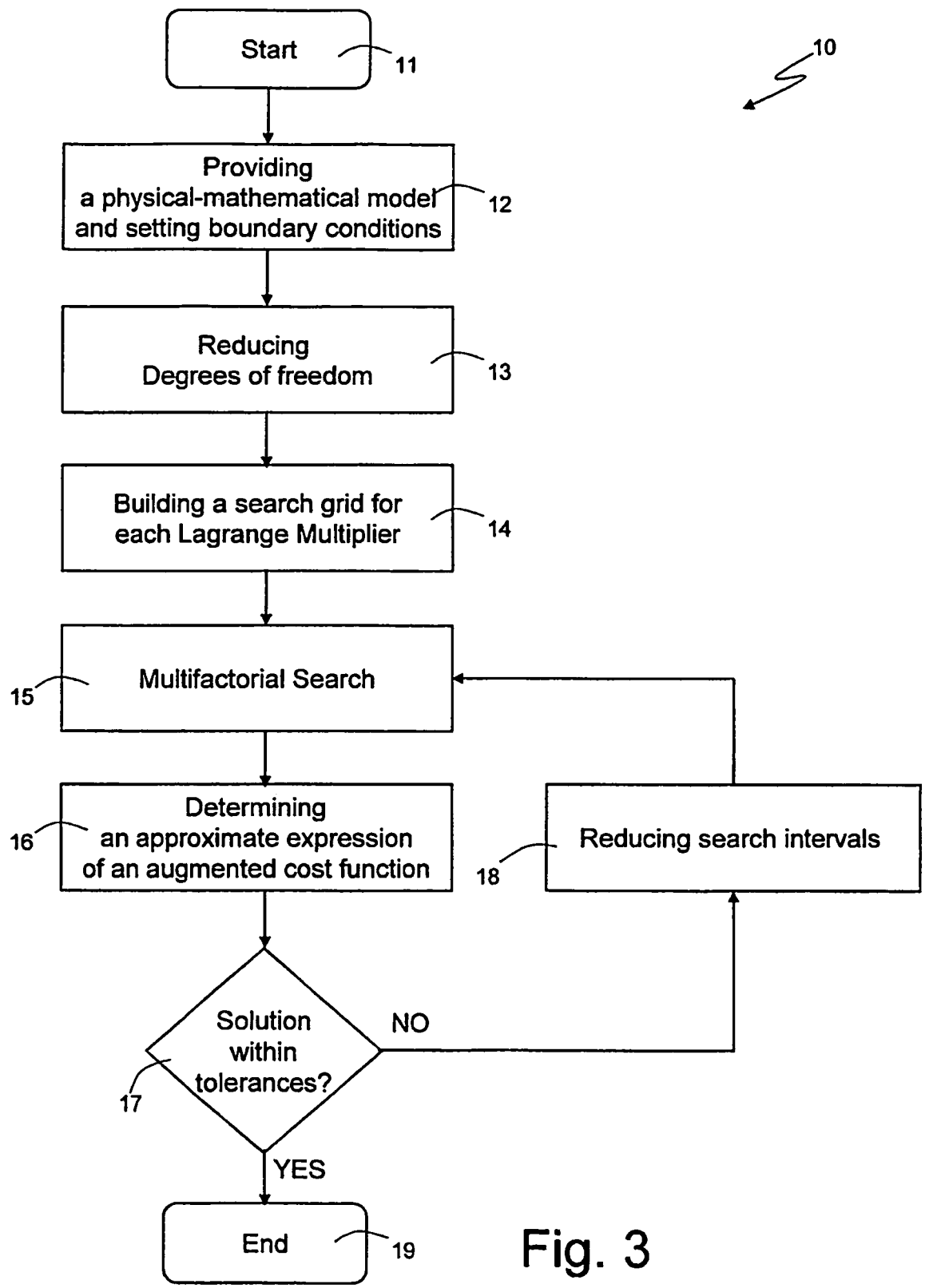
FIG. 3 shows a flow chart of a method for determining optimal trajectories of transfer for spacecrafts according to a preferred embodiment of the present invention.

In order to describe more in detail the present invention, FIG. 3 shows a flow chart of a method 10 for determining optimal trajectories of transfer for spacecrafts according to a preferred embodiment of the present invention.

In particular, as shown in FIG. 3, the method 10 comprises:
starting (block 11);
providing a physical-mathematical model and setting Boundary Conditions (block 12);
reducing the degrees of freedom (block 13);
building a search grid for each Lagrange multiplier (block 14);
a multifactorial search (block 15);
determining an approximate expression of an augmented cost function (block 16);
checking if a found solution is within tolerances (block 17);
if the found solution is not within tolerances (situation represented, in FIG. 3, by a first arrow marked with "NO"), reducing search intervals (block 18); and,
if the found solution is within tolerances (situation represented, in FIG. 3, by a second arrow marked with "YES"), ending (block 19).

In the followings, previously listed steps of the method 10 will be described in detail through an example, that is a minimum time, Earth-Mars interplanetary transfer with a low thrust propulsion system (i.e. a ion thruster) for which an optimal trajectory is determined on the basis of the method 10.

In detail, as for providing a physical-mathematical model and setting Boundary Conditions (block 12), given a reference frame xyzO with the x-axis towards the Aries point, the y-axis in the Ecliptic plane and the z-axis oriented to form a right-handed frame, the differential equations of motion shall be written as follows:

$$\begin{cases} \frac{dx}{dt} = u \\ \frac{dy}{dt} = v \\ \frac{dz}{dt} = w \\ \frac{du}{dt} = -\frac{\mu}{(x^2+y^2+z^2)^{\frac{3}{2}}} x + \delta \frac{T}{m} v_x \\ \frac{dv}{dt} = -\frac{\mu}{(x^2+y^2+z^2)^{\frac{3}{2}}} y + \delta \frac{T}{m} v_y \\ \frac{dw}{dt} = -\frac{\mu}{(x^2+y^2+z^2)^{\frac{3}{2}}} z + \delta \frac{T}{m} v_z \\ \frac{dm}{dt} = -\delta |k| \end{cases}$$

where the notation here-employed is analogous to that of the bi-dimensional system of equations previously described. As for the boundary conditions, let us assume that at an instant $t_0$ the spacecraft is exiting the Earth sphere of influence, and at an unspecified instant $t_f$ it enters into the Mars one (the spacecraft position and velocity vectors are assumed to be close to that of the planets in the given reference frame):

$$t = t_0 \begin{cases} r = r_{Earth} \\ V = V_{Earth}; \end{cases}$$

$$t = t_f \begin{cases} r = r_{Mars} \\ V = V_{Mars}; \end{cases}$$

where r={x;y;z} is spacecraft position vector and V={u;v;w} is spacecraft velocity vector.

As for the initial epoch $t_0$, let's assume that optimal solution is to be found within a given interval of a starting epoch $[t_{0,1};t_{0,2}]$; since the final epoch $t_f$ is not determined, and the minimum time problem is under analysis, the transversality condition $$H=1$$

is to be added. Besides, the following transversality condition $$\lambda_x \delta x + \lambda_y \delta y + \lambda_z \delta z + \lambda_u \delta u + \lambda_v \delta v + \lambda_w \delta w + \lambda_m \delta m = 0$$

is to be considered.

Moreover, as for reducing the degrees of freedom (block 13), as previously stated, the set of Lagrange multipliers could be potentially searched in $\Re^8$, but this would take a large amount of time before obtaining a satisfying solution. The efficiency of the algorithm according to the present invention lies also in the choice of the initial search region: the better is this choice, the smaller is the time required before the algorithm converges.

In particular, in the followings guidelines to reduce search domain and problem complexity are exhaustively described.

In detail, let $\lambda_r, \lambda_V$ be the vectors $\{\lambda_x, \lambda_y, \lambda_z\}$ and $\{\lambda_u, \lambda_v, \lambda_w\}$ respectively, and $\|\lambda_r\|, \|\lambda_V\|$ their modulus. Since the Hamiltonian function is proportional to an arbitrary constant value, it is always possible to choose such parameter so that $\|\lambda_r\|$ or $\|\lambda_V\|$ has a given value. Let's assume:

$$\|\lambda_V\| = \frac{m}{T}$$

By manipulating the expressions of the derivatives of the Lagrange multipliers, according to the Pontryagin maximum principle, it possible to prove that:

$$\left\| \frac{d\lambda_V}{dt} \right\| \approx \sqrt{\frac{\mu}{(x^2+y^2)^{\frac{3}{2}}}} \cdot \|\lambda_V\|$$

By recalling that $$\frac{d\lambda_V}{dt} = -\lambda_r$$

one gets:

$$\|\lambda_r\| \approx \sqrt{\frac{\mu}{(x^2+y^2)^{\frac{3}{2}}}} \cdot \|\lambda_V\|$$

This expression is really significant, since it states that $\|\lambda_r\|,\|\lambda_V\|$ are related one to another, and this reduces the boundaries of the search domain. Before the discover of this relation, the orders of magnitude of $\|\lambda_r\|,\|\lambda_V\|$ were assumed to be independent one from the other, leading to an increase of the search domain radius and consequently to an "explosion" of the time needed to the convergence: through such an expression, the search domain radius is fixed, and only the direction has to be determined. The relation above simply states that the ratio $$\frac{\|\lambda_r\|}{\|\lambda_v\|}$$

is as great as the term $$\frac{\|f\|}{\|V\|},$$

being $\|f\|$ the modulus of the acceleration and $\|V\|$ the magnitude of the velocity vector.

In particular, the relation states that $\|\lambda_r\|,\|\lambda_V\|$ are related one to another through an angular-velocity-related quantity which represents an angular velocity of an orbit round the Sun and depends on the Sun gravitation parameter ($\mu$).

Similarly, for an Earth-Moon transfer an analogous relation states that $\|\lambda_r\|,\|\lambda_V\|$ are related one to another through an angular-velocity-related quantity which represents an angular velocity of an orbit round the Earth and depends on the Earth gravitation parameter.

Once the magnitude of $\|\lambda_r\|,\|\lambda_V\|$ have been established, the only parameters left to determine are the orientation in space of the vectors $\|\lambda_r\|,\|\lambda_V\|$. Let $\phi_r, \Theta_r$ and $\phi_V, \Theta_V$ be the longitude and the elevation of $\|\lambda_r\|,\|\lambda_V\|$ respectively. The following conditions is to be therefore added:

$$\phi_r, \phi_V \in [0; 2\pi]$$
$$\partial_r, \partial_V \in [-\frac{\pi}{2}; \frac{\pi}{2}]$$

These four angles are the only variables to be determined to ensure that the boundary conditions are respected, and they are not truly independent one from the others, since the transversality conditions are still to be found.

Let's recall the transversality condition:

$$\lambda_x \delta x + \lambda_y \delta y + \lambda_z \delta z + \lambda_u \delta u + \lambda_v \delta v + \lambda_w \delta w + \lambda_m \delta m = 0$$

It is important to note that the initial spacecraft mass is fixed, therefore $\delta m=0$. Furthermore, the varied quantities $\delta x, \delta y, \delta z$ are not independent one from the others but are proportional to the spacecraft velocity vector V. In an analogous way, the varied quantities $\delta u, \delta v, \delta w$ are proportional to the gravitational acceleration $$-\frac{\mu}{r^3}r.$$

These considerations leads to the following relations:

$$\lambda_r \cdot V = 0$$
$$\lambda_V \cdot (-\frac{\mu}{r^3}r) = 0$$

so that only a couple of the four angles $\phi_r, \Theta_r, \phi_V, \Theta_V$ are truly independent.

At this point also the initial value of $\lambda_m$ can be evaluated. As for the Hamiltonian function one gets:

$$H = \lambda_r \cdot V + \lambda_V \cdot f + \lambda_m \cdot \dot{m} = 1$$

whereas, according to the transversality conditions, it must be $\lambda_r \cdot V = 0, \lambda_V \cdot f = 0$, wherein f is the spacecraft acceleration vector. Therefore:

$$\lambda_m = \frac{1}{\dot{m}}\left[1 - \|\lambda_V\|\frac{T}{m}\right]$$

which gives the analytic value of the Lagrange multiplier related to the propellant consumption.

Through these considerations, it has been possible to bound the search region from $\Re^8$ to a subspace in $\Re^3$, where only the initial epoch and a couple of angles are the truly independent parameters; furthermore such a subspace has a bounded radius, since the epoch range can be established through the mission requirements and the angles ranges between [0; 2π] (longitude) or $$[-\frac{\pi}{2}; \frac{\pi}{2}]$$

(elevation). This algorithm can be also applied to determine the trajectory allowing to save the greatest amount of propellant; the reduction of the degrees of freedom (block 13) described above is still valid, even if the transversality conditions slightly change.

Once the search intervals have been determined, it possible to execute the discretization of such intervals.

Then, as for building a search grid for each Lagrange multiplier (block 14), each range is divided by a node distribution; the number of nodes is chosen in accordance with computer performances and a number of parameters to be determined (the larger the number of nodes and parameters, the longer the time necessary to find the local minimum); the number of possible combination is equal to $N^l$, being N the number of the nodes for each distribution and l the number of parameters to be determined. As for the first iteration, the nodal distributions is equally spaced, since no information about the macroscopic trend of the functional (with respect to a given parameter) is available.

Figure 4:
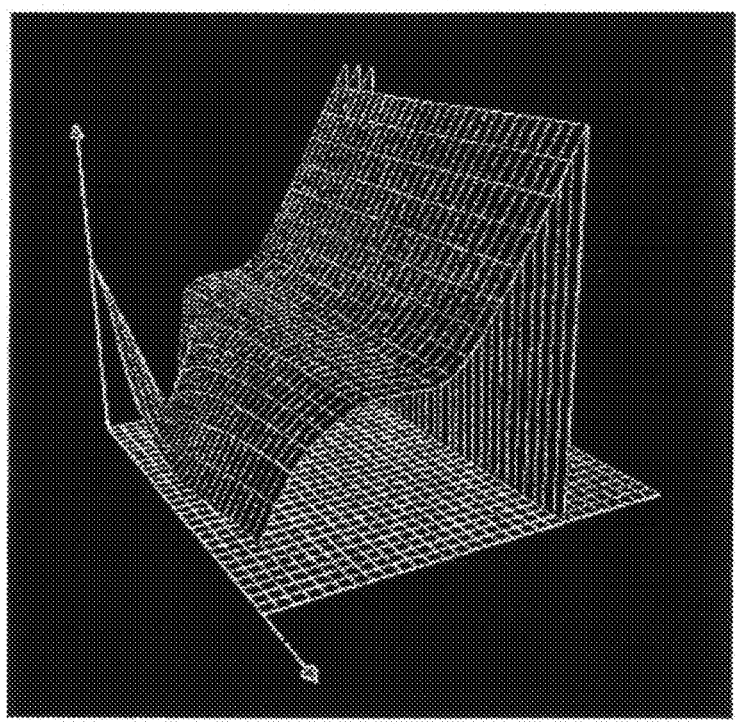
FIG. 4 shows a first search grid built for determining an optimal Earth-Mars transfer trajectory according to the method in FIG. 3.

FIG. 4 shows a first search grid built for determining the optimal Earth-Mars transfer trajectory according to said method 10. In FIG. 4 each point of the showed grid corresponds to a respective combination of the Lagrange multipliers.

The same considerations can be applied to determine the optimal initial epoch, if required: according to the given propulsion system and the spacecraft mass, there might not be opportunities to execute the optimal interplanetary mission if the mutual position of the starting point and the target has not be chosen correctly.

The algorithm searches for a suboptimal, fast-attainable approximate solution, integrating a simplified sets of equations, under the hypothesis that Earth and Mars orbits are coplanar (bi-dimensional motion):

$$t = t_f \begin{cases} \|r\| = \|r_{Mars}\| \\ \|V\| = \|V_{Mars}\| \\ \gamma = 0; \end{cases}$$

This assumption further reduces the degrees of freedom, allowing to quickly establish whether a solution exists or not.

Then, as for the multifactorial search (block 15), the cost function is evaluated for each different combination of the co-state starting values; the functional minimum value and the corresponding combination of Lagrange multipliers is stored, together with the state vector acquired at the end of the propagation. This part requires the largest amount of time according to the number of nodes in the grid. Let $\{\hat{\lambda}_{i,0}\}$ be the vector of multipliers giving the minimum value of the cost function among all the possible combination.

Figure 5:
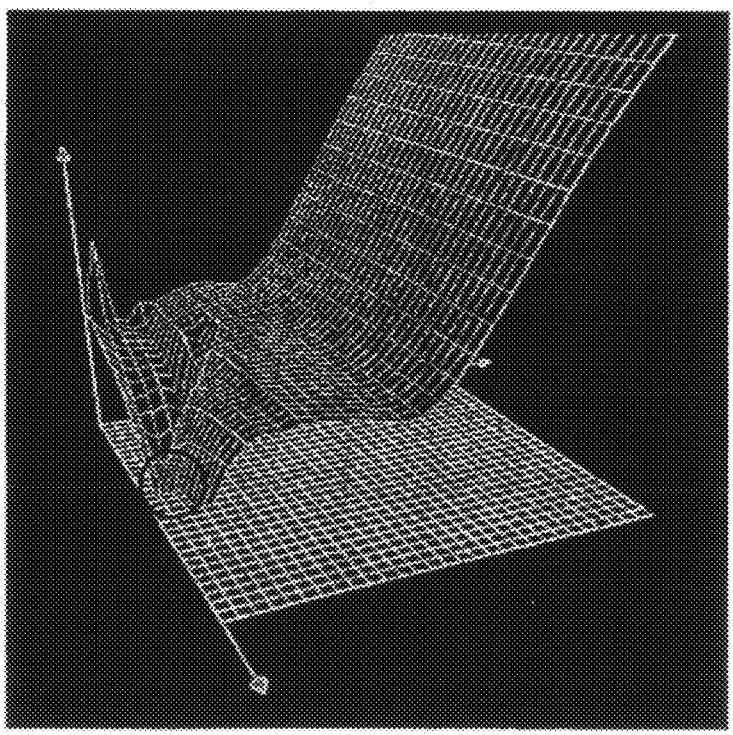
FIG. 5 shows a second search grid built for determining the optimal Earth-Mars transfer trajectory according to the method in FIG. 3.

FIG. 5 shows a second search grid built for determining the optimal Earth-Mars transfer trajectory according to said method 10. A white circle showed in FIG. 5 indicates a combination of angles $\phi_T, \Theta$, candidate for optimality.

Moreover, as for determining an approximate expression of an augmented cost function (block 16), all the simulations executed to determine the critical shape of the cost function can be employed to build an analytic expression of the approximate cost function with respect to the initial set of parameters. The functions chosen for the approximate representation change according to the given problem under analysis. The approximate expression of the cost functional allows a better estimation of the optimal solution (hopefully new candidates are closer to the true optimal set of initial parameters than those obtained through the multifactorial search) through the calculus of variation.

Finally, as for reducing search intervals (block 18), data previously stored are used to refine the solution. In particular, each search interval is reduced by a given factor $\beta$ and centred on the corresponding $\hat{\lambda}_{i,0}$; the number of nodes in each interval is maintained.

Figure 6:
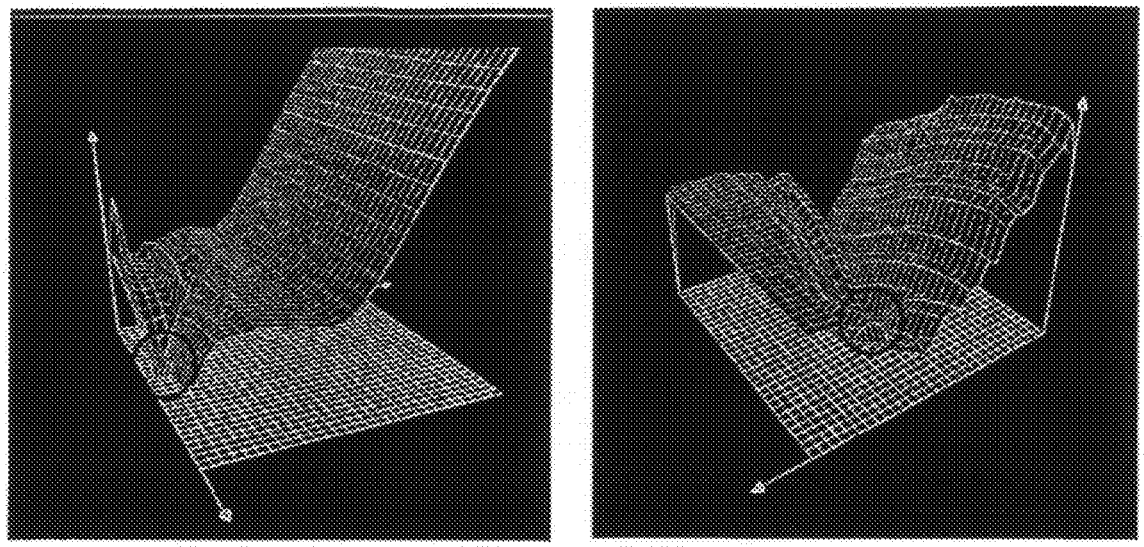
FIG. 6 shows the second search grid in FIG. 5 along with a third search grid built for determining the optimal Earth-Mars transfer trajectory according to the method in FIG. 3.

FIG. 6 shows two search grids built for determining the optimal Earth-Mars transfer trajectory according to said method 10, wherein the left-hand search grid is the second search grid already showed in FIG. 5, while the right-hand search grid is a third search grid built at a following refinement of the candidate solution and centred around the candidate solution.

In particular, in FIG. 6, two white circle highlight the self-adjustment of the search grid in a neighbourhood of the candidate solution obtained according to said preferred embodiment of the present invention.

Moreover, this technique allows to take into account the macroscopic trend of the functional with respect to a given multiplier, and to move toward the effective local minimum. Instead of considering an equally spaced nodal distribution, from now on it can be more convenient to consider a non linear distribution with, a greater concentration in the central region of each interval where it is most likely to find the local minimum of the functional. In the described example, for the i-th multiplier, a parabolic nodal distribution has been chosen, in fact a parabolic distribution of the grid nodes around the set of the approximate values is the simplest way to analyse the augmented cost function in the region where it is most likely to find the optimal multipliers set.

The whole process is repeated until the boundary conditions have been satisfied within a given tolerance, and no further improvement of the solution have been gained.

Figure 7:
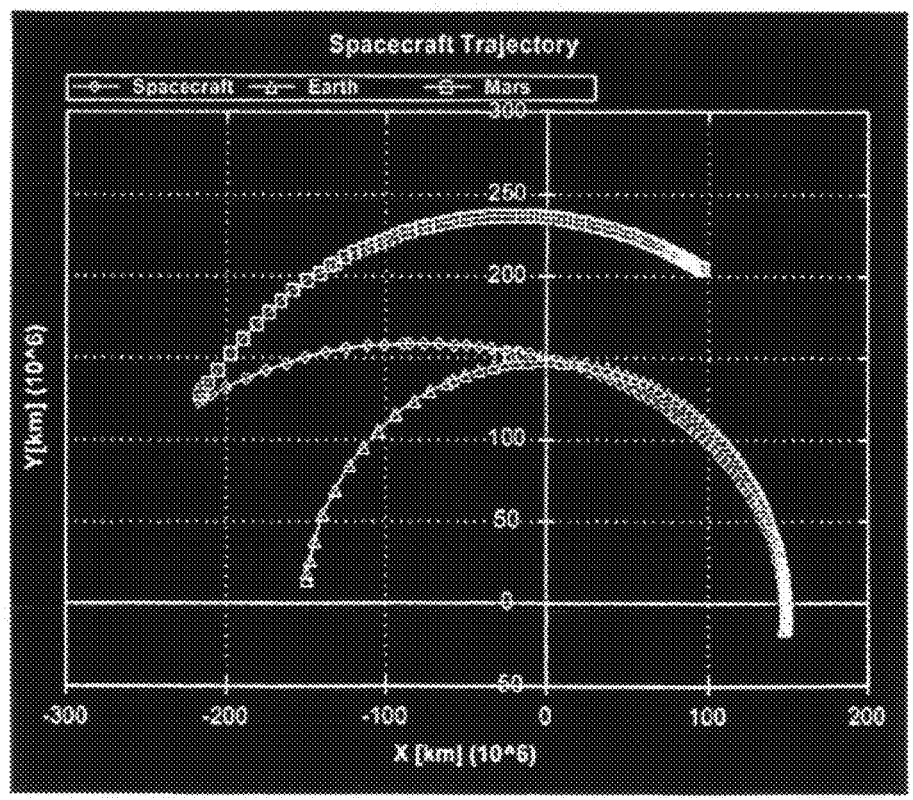
FIG. 7 shows the optimal Earth-Mars transfer trajectory determined according to the method in FIG. 3.

FIG. 7 shows a final, optimal Earth-Mars trajectory determined according to said method 10.

From the foregoing, it may be immediately appreciated that the most attractive advantages of the present invention are:

1) a short time required to converge towards the optimal solution;

2) if a solution cannot be found (for example if the launch window is not chosen properly or if the amount of on-board propellant of the thruster is not sufficient to perform the transfer), the method, according to the present invention allows to converge to a solution which is the closest to the boundary conditions;

3) no need for inputs from an external operator; and 4) a use of a reduced set of control parameters to determine the optimal transfer trajectory, each control parameter being truly independent from the others, as opposed to the known methods.

More in detail, the third advantage in the previous list represents a significant step forward, in comparison with known optimization algorithms which require a proper initial set of control parameters to converge, since the algorithm according to the present invention determines by itself the search domain.

Moreover, the software-implemented algorithm according to the present invention does not need a fine tuning when run.

All these features together enlarge the application fields of the algorithm towards a perturbative guidance, that is a re-evaluation in real-time (during the space mission) of the optimal control actions required whenever the actual spacecraft trajectory moves away from the determined optimal trajectory because of non-deterministic accelerations.

Furthermore, through the algorithm according to the present invention it is possible to establish whether an optimization problem involving minimum-time trajectories has a solution or not, and to determine such a solution within a limited number of iterations; this approach can be applied even to other kinds of trajectory, with satisfying results.

No strict assumptions concerning the state vector or the cost function have been made (continuity, derivability, etc.). The algorithm, because of its reshaping capability, converges to the optimal solutions, even if the cost function changes abruptly in space domain; since the conditions imposed by the Pontryagin maximum principle are respected, the found solution is expected to be the optimal one.

A further major advantage is that the approach of the present invention permits even a non-skilled user to solve optimization problems, since it does not require a knowledge of theoretical concepts concerning optimal control theory. Therefore, this algorithm can be used by almost anyone, in particular also by people having limited notions of space dynamics.

Finally, it is clear that numerous modifications and variants can be made to the present invention, all falling within the scope of the invention, as defined in the appended claims.

The invention claimed is:

1. A method for determining a trajectory for a transfer of a spacecraft from a starting space body to a target space body with respect to a given central space body, the determined trajectory being optimal with respect to a given space mission requirement to be met by the transfer of the spacecraft; the method comprising:

providing, according to the Pontryagin maximum principle, a physical-mathematical model relating model quantities and physical quantities representing the transfer of the spacecraft with respect to the given central space body, the model quantities comprising a first model vector quantity and a second model vector quantity, the first model vector quantity having a first modulus changing in time and a first space orientation which changes in time and is defined by a first longitude angle changing in time and by a first elevation angle changing in time, the first model vector quantity representing, instant by instant, a respective optimal direction of thrust of the spacecraft with respect to the given space mission requirement, the second model vector quantity having a second modulus changing in time and a second space orientation which changes in time and is defined by a second longitude angle changing in time and by a second elevation angle changing in time, the second model vector quantity representing, instant by instant, a time-evolution of the first model vector quantity;

setting, in the physical-mathematical model, starting and final boundary conditions, the starting boundary conditions being such that, at a starting time of the transfer, position and velocity of the spacecraft are close to position and velocity, respectively, of the starting space body, the final boundary conditions being such that, at a final time of the transfer, position and velocity of the spacecraft are close to position and velocity, respectively, of the target space body;

setting, in the physical-mathematical model, first conditions such that the second modulus is related to the first modulus through a angular-velocity-related quantity depending on the given central space body;

setting, in the physical-mathematical model, second conditions such that a specific longitude angle, between the first longitude angle and the second longitude angle, and a specific elevation angle, between the first elevation angle and the second elevation angle, are independent one from the others;

considering first starting times included in a given time range, first longitude values of the specific longitude angle included in a given longitude range, and first elevation values of the specific elevation angle included in a given elevation range; and determining a trajectory for the transfer of the spacecraft on the basis of the physical-mathematical model, of the considered first starting times, of the considered first longitude values, and of the considered first elevation values.

2. The method of claim 1, wherein determining a trajectory for the transfer of the spacecraft on the basis of the physical-mathematical model, of the considered first starting times, of the considered first longitude values, and of the considered first elevation values comprises:

computing values of a given cost function related to the given space mission requirement, the values of the given cost function being computed based on the considered first starting times, on the considered first longitude values and on the considered first elevation values;

determining an approximate cost function on the basis of the computed values of the given cost function;

computing values of the approximate cost function based on the considered first starting times, on the considered first longitude values and on the considered first elevation values;

identifying, among the computed values of the approximate cost function, an extreme value of the approximate cost function, and, among the considered first starting times, among the considered first longitude values, and among the considered first elevation values, an optimal starting time, an optimal longitude value, and an optimal elevation value, respectively, which the extreme value of the approximate cost function has been computed based on; and determining a trajectory for the transfer of the spacecraft on the basis of the physical-mathematical model, of the identified optimal starting time, of the identified optimal longitude value, and of the identified optimal elevation value.

3. The method of claim 2, wherein the identified optimal longitude value is, in the physical-mathematical model, the value of the specific longitude angle at the identified optimal starting time, and wherein the identified optimal elevation value is, in the physical-mathematical model, the value of the specific elevation angle at the identified optimal starting time.

4. The method according to claim 2, wherein the physical-mathematical model is based on Lagrange multipliers.

5. The model according to claim 2, wherein determining a trajectory for the transfer of the spacecraft on the basis of the physical-mathematical model, of the considered first starting times, of the considered first longitude values, and of the considered first elevation values further comprises:

identifying, among the computed values of the given cost function, an extreme value of the given cost function, and, among the considered first starting times, among the considered first longitude values, and among the considered first elevation values, a halfway optimal starting time, a halfway optimal longitude value, and a halfway optimal elevation value, respectively, which the extreme value of the given cost function has been computed based on.

6. The method according to claim 2, further comprising:

if the trajectory determined on the basis of the physical-mathematical model, of the considered first starting times, of the considered first longitude values, and of the considered first elevation values does not meet the starting boundary conditions and the final boundary conditions with a pre-defined tolerance:

selecting a time sub-range on the basis of the given time range and of the identified optimal starting time, selecting a longitude sub-range on the basis of the given longitude range and of the identified optimal longitude value, selecting an elevation sub-range on the basis of the given elevation range and of the identified optimal elevation value, considering second starting times included in the selected time sub-range, second longitude values of the specific longitude angle included in the selected longitude sub-range, and second elevation values of the specific elevation angle included in the selected elevation sub-range, and determining the trajectory for the transfer of the spacecraft on the basis of the physical-mathematical model, of the considered second starting times, of the considered second longitude values, and of the considered second elevation values;

selecting a time sub-range on the basis of the given time range and of the identified optimal starting time comprising:

selecting a time sub-range which is included in the given time range, has a smaller extent than an extent of the given time range, and is centred on the identified optimal starting time;

selecting a longitude sub-range on the basis of the given longitude range and of the identified optimal longitude value comprising:
  selecting a longitude sub-range which is included in the given longitude range, has a smaller extent than an extent of the given longitude range, and is centred on the identified optimal longitude value; and
selecting an elevation sub-range on the basis of the given elevation range and of the identified optimal elevation value comprising:
  selecting an elevation sub-range which is included in the given elevation range, has a smaller extent than an extent of the given elevation range, and is centred on the identified optimal elevation value.

7. The method of claim 6, wherein the considered first starting times are distributed uniformly in the given time range, while most of the considered second starting times are concentrated, in the selected time sub-range, around the identified optimal starting time; the considered first longitude values being distributed uniformly in the given longitude range, while most of the considered second longitude values being concentrated, in the selected longitude sub-range, around the identified optimal longitude value; the considered first elevation values being distributed uniformly in the given elevation range, while most of the considered second elevation values being concentrated, in the selected elevation sub-range, around the identified optimal elevation value.

8. The method of claim 7, wherein the considered second starting times are distributed, in the selected time sub-range, according to a first parabolic distribution, wherein the considered second longitude values are distributed, in the selected longitude sub-range, according to a second parabolic distribution, and wherein the considered second elevation values are distributed, in the selected elevation sub-range, according to a third parabolic distribution.

9. The method according to claim 6, further comprising:
  if the trajectory determined on the basis of the physical-mathematical model, of the considered second starting times, of the considered second longitude values, and of the considered second elevation values does not meet the starting boundary conditions and the final boundary conditions with the pre-defined tolerance, repeating:
    selecting a new time sub-range on the basis of a previously selected time sub-range and of a previously identified optimal starting time,
    selecting a new longitude sub-range on the basis of a previously selected longitude sub-range and of a previously identified optimal longitude value,
    selecting a new elevation sub-range on the basis of a previously selected elevation sub-range and of a previously identified optimal elevation value,
    considering new starting times included in the selected new time sub-range, new longitude values of the specific longitude angle included in the selected new longitude sub-range, and new elevation values of the specific elevation angle included in the selected new elevation sub-range, and
    determining the trajectory for the transfer of the spacecraft on the basis of the physical-mathematical model, of the considered new starting times, of the considered new longitude values, and of the considered new elevation values;
  and
  stopping repeating if the trajectory determined on the basis of the physical-mathematical model, of the considered new starting times, of the considered new longitude values, and of the considered new elevation values meets the starting boundary conditions and the final boundary conditions with the pre-defined tolerance.

10. The method of claim 9, wherein most of the considered new starting times are concentrated, in the selected new time sub-range, around the previously identified optimal starting time, wherein most of the considered new longitude values are concentrated, in the selected new longitude sub-range, around the previously identified optimal longitude value, and wherein most of the considered new elevation values are concentrated, in the selected new elevation sub-range, around the previously identified optimal elevation value.

11. The method of claim 10, wherein the considered new second starting times are distributed, in the selected new time sub-range, according to a first parabolic distribution, wherein the considered new longitude values are distributed, in the selected new longitude sub-range, according to a second parabolic distribution, and wherein the considered new elevation values are distributed, in the selected new elevation sub-range, according to a third parabolic distribution.

12. The method according to claim 2, wherein the approximate cost function is determined by interpolating the computed values of the given cost function.

13. The method according to claim 1, wherein the model quantities comprise a model scalar quantity related to propellant consumption of the spacecraft for the transfer.

14. The method of claim 13, wherein the given space mission requirement is a minimum time for the transfer of the spacecraft, and wherein the model scalar quantity depends on a derivative of a mass of the spacecraft with respect to time.

15. The method according to claim 1, wherein the given central space body is the Sun, wherein the starting space body and the target space body are space bodies orbiting the Sun, and wherein the angular-velocity-related quantity represents an angular velocity of an orbit round the Sun and depends on a Sun gravitation parameter.

16. The method according to claim 1, wherein the given central space body is the Earth, and wherein the angular-velocity-related quantity represents an angular velocity of an orbit round the Earth and depends on an Earth gravitation parameter.

17. The method according to claim 1, wherein the given space mission requirement is a minimum propellant consumption by the spacecraft for the transfer.

18. A non-transitory computer readable medium comprising software code portions for implementing, when run on an electronic processor, the method according to claim 1.

19. An electronic processor configured to implement the method according to claim 1.

20. A spacecraft comprising an electronic processor configured to implement the method according to claim 1.

* * * * *